United States Patent [19]

Jensen

[11] Patent Number: 4,825,621
[45] Date of Patent: May 2, 1989

[54] HOLDDOWN

[75] Inventor: Mark B. Jensen, Bothell, Wash.

[73] Assignee: MiTek Industries, Inc., Creve Coeur, Mo.

[21] Appl. No.: 131,002

[22] Filed: Dec. 10, 1987

[51] Int. Cl.⁴ .................................................. E04B 1/38
[52] U.S. Cl. .................................... 52/702; 403/232.1; 403/237
[58] Field of Search .................. 52/702, 289, 263; 403/232.1, 190, 237; 182/228

[56] References Cited

U.S. PATENT DOCUMENTS

| 666,918 | 1/1901 | Butz | 403/232.1 |
| 874,514 | 12/1907 | Lindow | 403/190 |
| 4,594,017 | 6/1986 | Hills | 52/702 |
| 4,665,672 | 5/1987 | Commins et al. | 403/232.1 |

Primary Examiner—James L. Ridgill, Jr.
Attorney, Agent, or Firm—Senniger, Powers, Leavitt and Roedel

[57] ABSTRACT

A one-piece holddown comprising a back plate, opposing parallel side plates, and overlapping parallel base plates. The side plates are integrally connected to the back plate, and the base plates are integrally connected to respective side plates, creating a one piece holddown. The upper portions of the side plates adjoining the back plate are narrower than the side plates' lower portions, which extend below the lower edge of the back plate. The base plates are each integrally connected along a base edge of a side plate, and extend perpendicularly toward the opposite side plate. Aligned base holes allow the holddown to be attached by its base plates to an anchor bolt in a concrete foundation. Two back holes allow the back plate to be attached to a stud oriented perpendicularly to the foundation.

A method for continuously manufacturing holddowns using a four-stage progressive die. A punching operation forms base holes, back holes, and laterally spaced slots along the upper edge of the back portion which will form the holddown's back plate. A cutting operation separates the back portion and laterally opposed side portions from the continuous sheet, forming a Y-shaped blank. A connecting tab between the slots is left uncut so that the blanks can be advanced together. A first bending operation bends end portions of the blank's arms perpendicularly to form the base plates. A second bending operation bends the blank's side portions perpendicularly to the back portion to form the holddown's side plates, thereby overlapping the base plates with each other.

14 Claims, 3 Drawing Sheets

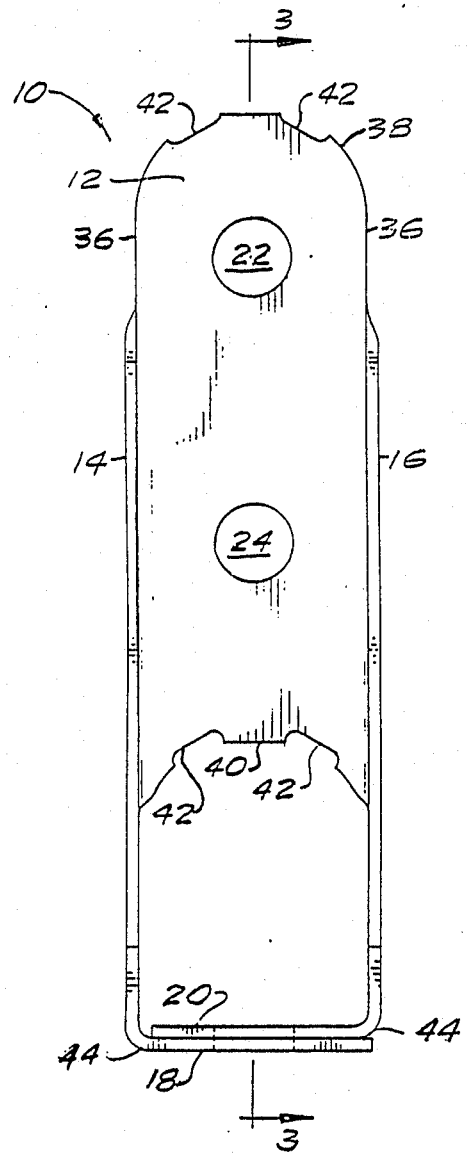
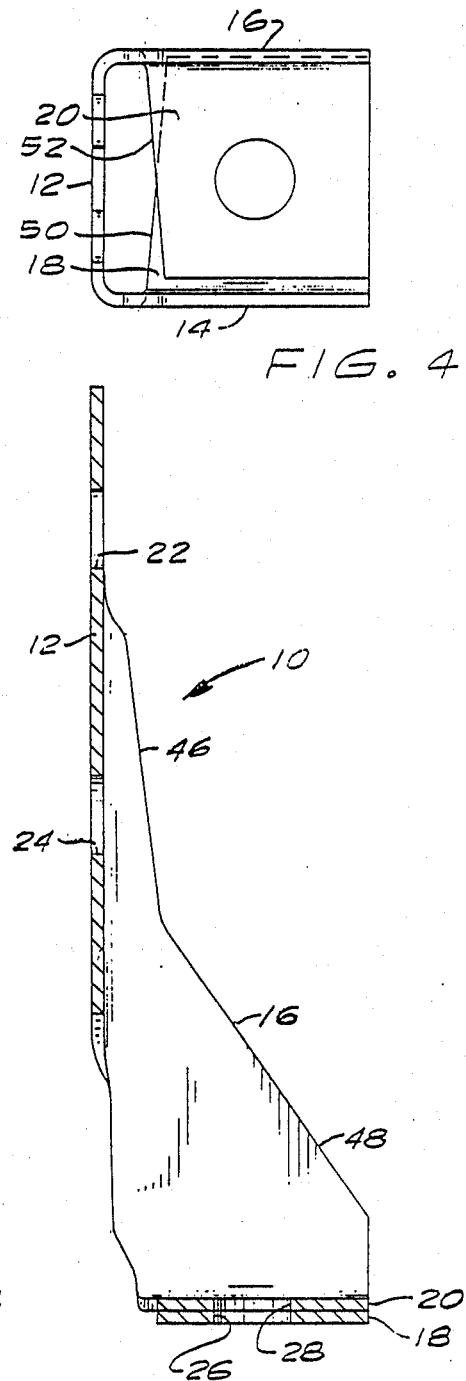
FIG. 2  FIG. 3  FIG. 4

HOLDDOWN

BACKGROUND

1. Technical Field

This invention relates to structural connectors, and more particularly to holddowns for connecting perpendicular structural elements to resist tensile forces between them.

2. Description of the Prior Art

Holddowns are metal connectors typically used to tie wooden framing studs to concrete foundations. Holddowns are needed in areas where buildings are subject to significant seismic and wind loads. In such areas toenailing the studs to a wooden mudsill extending along the top of the concrete foundation is inadequate to anchor the building to the foundation, even though the mudsill itself may be securely bolted to the foundation. The toenailed studs may pull away from the mudsill during an earthquake or windstorm.

A holddown essentially comprises an upstanding back element attached to the stud, and a shorter horizontal base element attached to an upstanding anchor bolt embedded in the concrete. The back element is typically a flat metal plate attached to the stud by two or more conventional metal bolts. The base element typically has a single central hole through which extends the upper end of the embedded anchor bolt. A washer and threaded nut securely hold the base element on the anchor bolt. Substantially diagonal side elements oriented perpendicularly to both the base and back elements and attached along respective sides thereof provide additional structural strength.

Early holddowns were constructed from heavy gauge metal pieces welded together. The manual labor required to cut and weld the pieces made these early holddowns relatively expensive. An example of a welded holddown is shown in U.S. Pat. No. 4,192,118. To reduce manufacturing costs, holddowns have been developed which can be manufactured from continuous sheet metal stock using modern progressive die metal working equipment.

An example of a one-piece holddown, shown in U.S. Pat. No. 4,665,672, is formed from a single long thin strip of metal sheet stock. A middle portion of the strip is bent to form a seat or base member and side members. The ends of the strip are bent and overlapped to form two back members, one of which extends beyond the other. A lower set of back openings extends through the overlapped back members, while an upper one or more back openings extend only through the longer back member. The seat or base member is bolted through the mudsill to the foundation, and the back members are bolted to the stud.

The maximum load allowed on a holddown by the Uniform Building Code is primarily determined by the wooden stud's resistance to longitudinal splitting initiated by the bolts connecting the stud to the back member of the holddown. For this reason, the Code requires that the center of the hole for the lower stud bolt be spaced a minimum of seven bolt diameters from the end of the stud. This requirement is based on the assumption that the load on the stud from the stud bolts is evenly distributed between the bolts. The holddown of U.S. Pat. No. 4,665,672 does not, however, evenly distribute the load between the stud bolts. The upper stud bolt, which engages only the longer of the two back members, receives a smaller portion of the total load than does the lower stud bolt which engages both of the back members. This excess load on the lower stud bolt may initiate splitting of the stud at significantly lower overall loads than those predicted by the Code's seven bolt diameter requirement discussed above.

SUMMARY OF THE INVENTION

This invention provides a holddown which distributes the load evenly between the bolts attaching the back of the holddown to a structural member such as a stud.

This invention further provides a holddown which may be fabricated as a single piece from a continuous sheet metal strip using progressive die metal working equipment.

The invention resides in a holddown or other apparatus for connecting first and second perpendicular structural elements, such as a stud and a foundation, respectively using first and second attachment means such as bolts. The apparatus comprises a back plate, parallel first and second side plates, and parallel overlapping first and second base plates. The back plate has at least one opening for receiving the first attachment means. The side plates are integrally connected perpendicularly to the back plate along respective side edges of the back plate. The base plates are integrally connected perpendicularly to the first and second side plates, respectively, along the base edges of the side plates. The base plates have aligned openings for receiving the second attachment means.

The invention also resides in a method for manufacturing a structural connector such as a holddown from a metal sheet having a continuous longitudinal dimension and a narrow lateral dimension. At least one back opening and first and second base openings are made in the sheet. The base openings for a given holddown are laterally aligned and spaced apart from each other, and are offset longitudinally from the back opening. The sheet is cut to form a central back portion including the back opening and first and second side portions integrally connected to the back portion along longitudinal forming lines. The sheet is also cut to form substantially rectangular first and second base portions offset longitudinally from the side portions to include the base openings, and integrally connected to the side portions along lateral forming lines. The base portions are bent along their lateral forming lines until they are oriented in the same direction perpendicularly of the back and side portions. The side portions are then bent along their longitudinal forming lines until they are oriented in the same direction perpendicularly of the back portion, so that the base portions overlap each other with their base openings in registration.

BRIEF DESCRIPTION OF THE DRAWINGS

FIG. 2 is a front elevational view of the holddown of FIG. 1, showing especially the back plate and the overlapped base plates.

FIG. 3 is a side elevational cross-sectional view of the holddown of FIG. 1, showing especially the side plates and the base holes.

FIG. 4 is a top plan view of the holddown of FIG. 1, showing particularly the base plates.

DESCRIPTION OF THE PREFERRED EMBODIMENT

Figure 1:
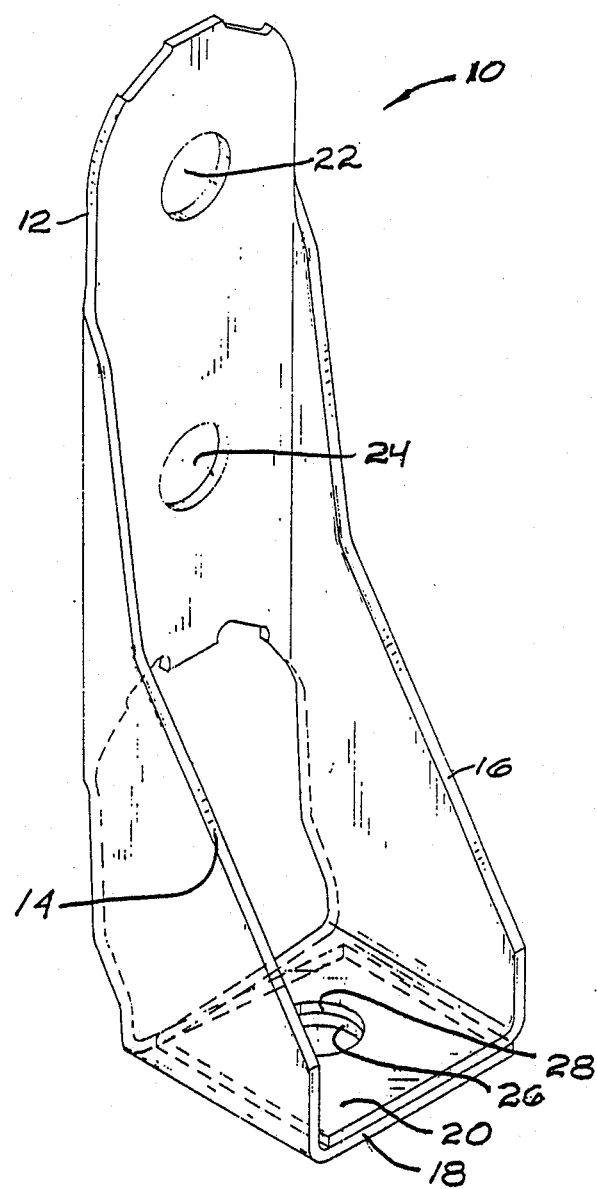
FIG. 1 is an isometric view of a holddown according to the present invention.

As seen in FIG. 1, a holddown 10 according to this invention is formed from a single piece of sheet metal stock and comprises a back plate 12, first and second side plates 14, 16, and overlapped first and second base plates 18, 20. Upper and lower back holes 22, 24 extend through the back plate 12. Base holes 26, 28 extend respectively through the first and second base plates 18, 20 in registration with each other.

Figures 5, 6:
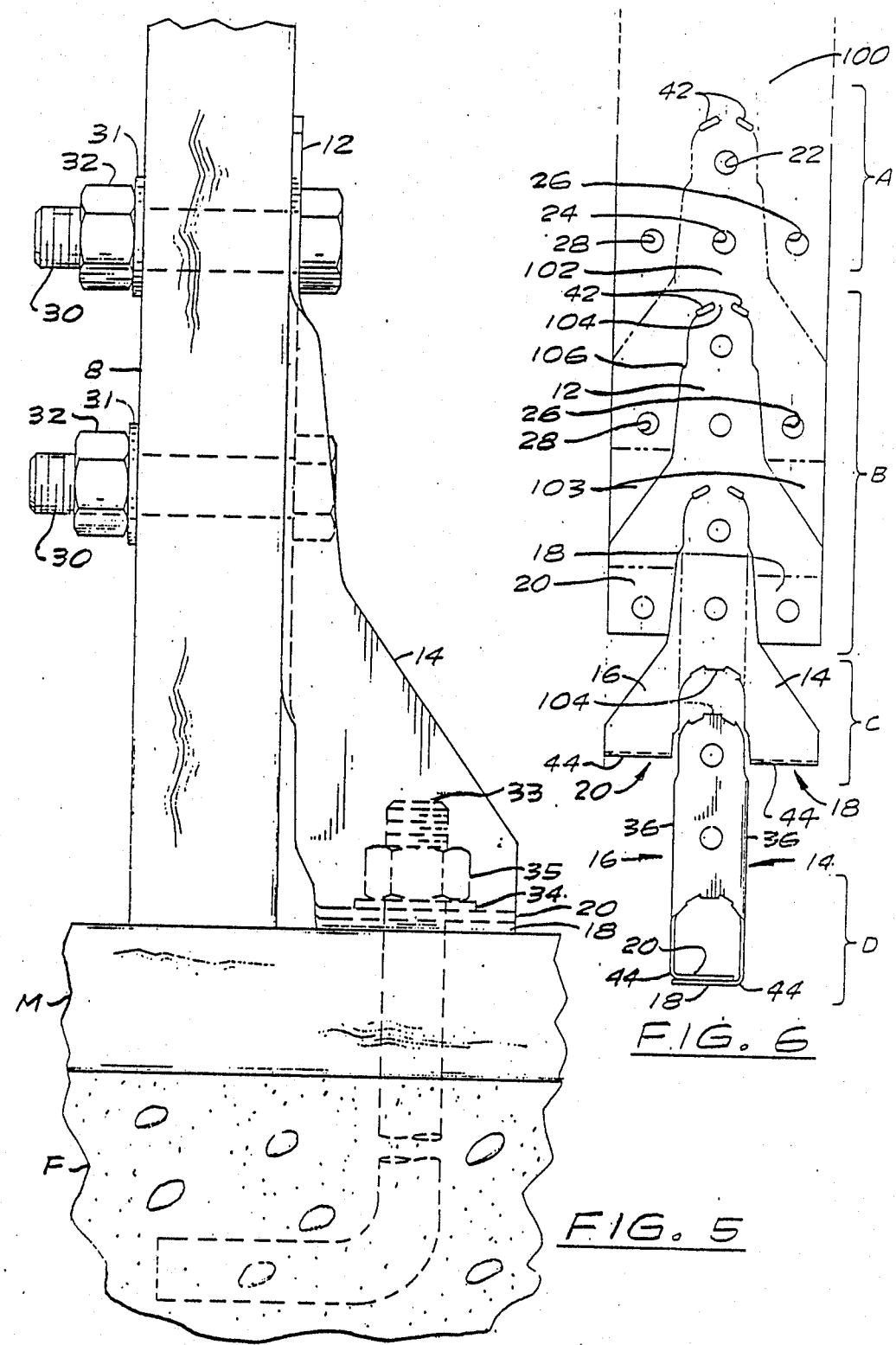
FIG. 5 is a side elevational view of the holddown of FIG. 1 as installed to connect a wooden stud to a wooden mudsill and concrete foundation wall.
FIG. 6 is a top plan view of holddowns being manufactured from a continuous strip of metal sheet stock according to the method of this invention.

The holddown 10 is installed to connect a stud S to an underlying concrete foundation wall F, typically through a mudsill M lying atop the foundation wall. As seen in FIG. 5, the holddown 10 is attached to the stud S by its back plate 12, and to the mudsill M and foundation F by its base plates 18, 20. The back plate 12 and stud S are attached by stud bolts 30 extending through the upper and lower holes 22, 24 in the back plate 12, and washers 31 and threaded nuts 32 on the stud bolts. The base plates 18, 20 are attached to the mudsill M and the foundation F by a single threaded anchor bolt 33 extending through the aligned holes 26, 88 of the base plates, with a washer 34 and a threaded nut 35 on the anchor bolt. The washer 34 between the anchor bolt nut 35 and the upper second base plate 20 distributes the load evenly across the base plates 18, 20. The holddown 10 is integrally formed from sheet metal as described below.

As seen in FIG. 2, the back plate 12 is a flat sheet metal member having parallel side edges 36 and substantially semi-circular upper and lower edges 38, 40. The upper edge 38 of the back plate 12 follows a convex curve between the back plate's side edges 36. The back plate's lower edge 40 follows a matching concave curve having a radius equal to the radius of the semi-circular curve of the upper edge 38. Laterally aligned but spaced apart indentations in the back plate's otherwise semi-circular upper and lower edges 38, 40 are produced by slots 42 produced during fabrication of the holddown 10, as described in more detail below.

As best seen in FIG. 3, the side plates 14, 16 rigidly support the back plate 12 perpendicularly above the base plates 18, 20. Each side plate 14, 16 is integrally connected perpendicularly along an upper portion of its straight vertical back edge to a lower portion of one of the side edges 36 of the back plate 12. The side plates 14, 16 extend from about midway between the back plate's upper and lower edges 38, 40 to well below the back plate's lower edge 40. The side plates 14, 16 extend generally perpendicularly in the same direction (forwardly) from the back plate, so that they are parallel and spaced apart from each other by a distance equal to the width of the back plate 12. The lower or base edges 44 of the side plates 14, 16 are generally perpendicular to the side plates' back edges.

The side plates' front edges extend substantially diagonally between the upper end of the side plates' back edges and the front ends of their base edges, and are divided into upper and lower segments 46, 48. A short uppermost portion of each side plate's upper front edge 46 flares outwardly from the back plate 12 at an angle of about 35°. Below this flare, the upper front edge 46 of each side plate 14, 16 angles shallowly away from the back plate 12 an acute angle of about 10° with respect to the back plate. Continuing below the upper front edge 46, each side plate's lower front edge 48 angles more broadly away from the back plate 12, at an angle of about 35° with respect to the back plate. The lowermost portion of the side plate's lower front edge 48 descends substantially vertically to the side plate's base edge 44. It will thus be seen that the front edge of each of the side plates 14, 16 comprises a shallow V-shape oriented with its apex toward the lower back corner of the side plate.

The first and second base plates 18, 20 are integrally connected generally perpendicularly of the first and second side plates 14, 16, respectively, along the side plates' base edges 44. The base plates 18, 20 inwardly extend from their respective side plates 14, 16 perpendicularly of the opposite side plate, and thus substantially span the gap between the side plates. The base plates 18, 20 overlap each other, with the first base plate 18 being spaced below and substantially in proximal contact with the second base plate 20. The first base hole 26 extends substantially centrally through the first base plate 18, and the second base hole 28 extends substantially centrally through the second base plate 20 in vertical registration with the first base hole 26.

As seen in FIG. 4, the base plates 18, 20 are substantially but not perfectly rectangular. In particular, the back edges 50, 52 of the base plates 18, 20, respectively, angle slightly toward the front edges of the base plates, forming an angle of about 10° with respect to the plane of the back plate 12. The angled back edges 50, 52 do not significantly reduce the strength of the base plates 18, 20, and greatly facilitate the manufacturing of the holddown 10 from continuous metal sheet stock.

The holddown 10 may be used to connect any two perpendicularly related structural elements, although it is typically used to connect a stud S to a wooden mudsill M and concrete foundation wall F as shown in FIG. 5. The mudsill M is a wooden member of rectangular cross section laid flat along the top of the concrete foundation wall F. An L-shaped anchor bolt 33 is embedded in the concrete foundation wall F, with a vertical portion of the bolt extending upwardly from the concrete foundation wall through the wooden mudsill M to a threaded upper end spaced above the mudsill. The holddown 10 is attached to the mudsill M and foundation wall F by slipping the base plates 18, 20 of the holddown around the upper end of the anchor bolt 33, which extends through the aligned base holes 26, 28 until the lower base plate 18 rests against the mudsill M. A conventional washer 34 is placed over the upstanding end of the anchor bolt 33 into proximal contact with the upper second base plate 20, and a conventional nut 35 is threaded onto the bolt and tightened down onto the washer 34.

The wooden stud S extends perpendicularly upwardly from the mudsill M, with the lower end of the stud abutting the upper surface of the mudsill. The back plate 12 of the holddown 10 is placed flat against one of the vertical surfaces of the stud S, and is attached to the stud S by two stud bolts 30, each extending through one of the holes 22, 24 in the back plate 12. The stud bolts 30 are attached to the stud S by conventional washers 31 and threaded nuts 32. To comply with current building code requirements, the center of the lower back hole 24 is spaced upwardly from the lower base plate 18 so that the axis of the lower stud bolt 30 is spaced upwardly from the lower end of the stud S by a distance at least seven times the diameter of the stud bolt.

As shown schematically in FIG. 6, the holddown 10 of this invention is particularly well suited to being manufactured from continuous metal sheet stock using a progressive multi-stage die metal working device. The sheet metal stock 100 is suitably 11 gauge galvanized steel, A.S.T.M. A446, Grade A, having a continuous longitudinal dimension and a relatively narrow lateral dimension.

Each holddown 10 is produced from the metal sheet 100 oriented with its side and base plates extending downwardly from its back plate, and with its base closer to the free end of the sheet. The holddown's back plate 12 is formed from a central longitudinal third portion of the sheet, with each side third portion of the sheet forming the one of the holddown's side plates and base plates. The steps required in manufacturing the holddowns 10 from continuous metal sheet stock can be grouped into four operations: a punching operation A, cutting operation B, and first and second bending operations C, D. This grouping allows the holddowns 10 to be efficiently produced using a four-stage progressive die.

The holddowns 10 are cut out from the continuous sheet 100 as Y-shaped blanks 102. Each blank 102 is oriented opening in the direction in which the sheet 100 are advanced, i.e. toward the free end of the sheet, and is nested with adjoining blanks to minimize waste. The stem of each generally Y-shaped blank 102 comprises the back plate 12 of the finished holddown 10, and is formed from the metal between the arms of the immediately following blank. The far ends of the arms of the blank 102 become the base plates 18, 20 of the holddown 10.

The punching operation A punches out the back holes 22, 24, the base holes 26, 28, and the slots 42 at the upper edge of the back plate 12. The back holes 22, 24 are aligned along the longitudinal center line of the back plate 12, and therefore along the longitudinal center line of the sheet 100. The base holes 26, 28 open through the base plates 18, 20, which are formed from opposite side thirds of the sheet during the cutting operation B. The base holes 26, 28 are substantially aligned laterally across the sheet 100, and are substantially centered in the opposite side third portions of the sheet. Because the base plates 18, 20 of the finished holddown 10 are spaced well below the back plate 12, the base holes 26, 28 for a given holddown are longtitudinally offset toward the free end of the sheet 100 from the holddown's back holes 22, 24.

The base holes 26, 28 are located at the ends of the arms of a blank 102 and therefore on either side of the stem or back plate 12 of the previously punched blank, being laterally aligned substantially with the lower back hole 24 thereof. To prevent the punching of a blank's base holes 26, 28 from interfering with the cutting operation forming the back plate 12 of the previously punched blank, the back holes, slots and base holes for a given blank are not punched simultaneously. Rather, as the back holes 22, 24 and slots 42 are punched in a given blank 102, the base holes 26, 28 are simultaneously punched for the next following blank.

The cutting operation B, which immediately follows the punching operation A, separates the stem and arms of the Y-shaped blank 102 from the next following Y-shaped blank. The cutting operation B also squares the end of each arm of the Y-shaped blank 102, cutting off from each side of the sheet 100 a triangular scrap 103 defined by the end of the laterally oriented edge of the arm, the outwardly angling outer side edge of the arm of the previously cut blank, and the edge of the sheet. Because the interior portion between the arms of the blank is cut out when the stem of the previously cut blank is cut out, after the cutting operation B the punched and cut out blank 102 need only be bent into its final configuration to form the holddown 10.

The cutting operation B does not completely sever each blank from the next following blank. The cutting extends only to the slots 42 at the end of the blank's stem, leaving an uncut tab 104 connecting the stem to the apex of the gap between the arms of the next following blank. The elongated slots 42 are centered on the generally semi-circular curve of the back plate's upper edge 38 and oriented with their longitudinal center lines substantially tangent to said upper edge. When the back plate 12 is cut out, the transverse width of the slots 42 provides a suitable tolerance to accommodate possible misalignment of the cutter. The slots 42 are laterally separated from each other by about ½ inch, so that the connecting tab 104 between successive blanks 102 is about ½ inch wide. The connecting tabs 104 between successive blanks 102 allow the unfinished blanks to be advanced together through the progressive die by advancing the entire metal sheet 100.

The stem of the Y-shaped blank 102 includes opposing laterally outward flares 106 which form the uppermost ends of the upper front edge side 46 of the plates 14, 16.

After the cutting operation B the blank 102 is advanced to the next stage of the progressive die where the first bending operation C forms the base plates 18, 20 from the end portions of the arms of the Y-shaped blank. The first bending operation C bends the far end portions of the arms of the blank 102 downwardly along a lateral forming (bend) line until such end portions, which now comprise the first and second base plates 18, 20, are perpendicular to the remainder of the flat blank 102. The base plates 18, 20 are thus integrally connected to the remainder of the blank 102 along the lateral forming lines, which will comprise the base edges 44 of the side plates 14, 16 after the second bending operation D.

The lateral forming lines of the base plates 18, 20 are longitudinally offset from each other a small distance in order that the base plates will be suitably offset from, and thereby overlap, each other when the holddown 10 is completely formed. The lateral forming line of the first base plate 18, which is ultimately positioned immediately beneath the second base plate 20, is offset from the lateral forming line of the second base plate 20 about 3/16th inch toward the ends of the arms of the blank 102.

In the second bending operation D, the side plates 14, 16 are formed and the base plates 18, 20 are bent toward and overlapped with each other. The side plates 14, 16 of the holddown 10 are formed from the remaining flat portions of the arms of the Y-shaped blank 102 together with the edge portions of the blank's stem between the flare 106 and the blank's arms. The second bending operation D bends the side plates 14, 16 downwardly along longitudinal forming (bend) lines which comprise the side edges 36 of the back plate 12 until they are perpendicular to the back plate 12. As the side plates 14, 16 are so bent, the base plates 18, 20 integrally connected along the side plates' base edges 44 are swung inwardly toward each other. The offset in the lateral forming lines of the base plates 18, 20 ensures that the base plates closely overlap each other. To ensure that the free end of the second base plate 20 does not jam against the first side plate 14, the second base plate 20 is cut about ⅛th inch shorter than the first base plate 18 during the cutting operation B.

Immediately before the second bending operation D is performed, the connecting tab 104 connecting the blank 102 to the following blank is cut and the blank 102 is advanced so that the bending equipment for the second bending operation D does not interfere with the equipment for the first bending operation C. Upon completion of the second bending operation D the holddown 10 is completely formed with the side plates 14, 16 perpendicular to the back plate 12, with the base plates 18, 20 overlapping each other perpendicularly between the side plates 14, 16, and with the base holes 26, 28 of the base plates in registration with each other.

It will be appreciated that, although specific embodiments of the apparatus and method of this invention have been described for purposes of illustration, various modifications may be made without departing from the spirit and scope of the invention. A different number of holes, such as three, or four, or one, may be formed in the back plate 12 in place of the two back holes 22, 24 described above. The front edges of the side plates 14, 16 may be formed straight instead of with the concave V-shape provided by the upper and lower front edges 46, 48 described herein. The flare 106 and the upper portion of the side plates 14, 16 might be eliminated, leaving each side plate attached to the back plate 12 along a shorter portion of the back plate's side edges 36. Accordingly, the scope of the invention is not limited except as by the following claims.

What is claimed is:

1. A holddown formed from a single generally inverted Y-shaped blank of sheet metal stock having a stem and two diverging branches, the profile of the stem being the same as the space between the branches so that the stems and branches of successive blanks can interfit in an end to end relationship, the holddown, adapted for connecting first and second generally perpendicular structural elements using first and second attachment means;

each branch of the blank being folded along a line generally parallel with the axis of the stem so that the stem forms a back plate having at least one opening for receiving the first attachment means for attaching the back plate to the first structural element, and so that the branches form generally parallel first and second side plates extending in one direction, constituting the forward direction, from the back plate at opposite sides thereof, said side plates being integrally connected to the back plate along respective side edges of the back plate;

each branch of the blank also being folded toward the other along a generally transverse fold line to form generally parallel overlapping first and second base plates disposed forward of the plane of the back plate and extending inwardly from said first and second side plates generally at right angles to the side plates, said first and second base plates being integrally connected to the first and second side plates, respectively, along the base edges of the side plates, the base plates having aligned openings for receiving the second attachment means for attaching the base plates to the second structural element.

2. A holddown according to claim 1, wherein the openings through the base plates comprise circular holes, and wherein the second attachment means comprises a cylindrical bolt closely fitting within the aligned holes through the base plates.

3. A holddown according to claim 1, wherein the side plates extend beyond the base edge of the back plate.

4. The holddown according to claim 1 wherein the end of the stem of the blank that forms the top of the back plate and end of the stem between the branches that forms the bottom of the back plate have mating semi-circular shapes.

5. A holddown according to claim 1, wherein the opening through the back plate comprises a circular hole, and wherein the first attachment means comprises a cylindrical bolt closely fitting within the hole through the back plate.

6. A holddown according to claim 5, wherein the back plate has two spaced apart circular holes.

7. A holddown according to claim 6, wherein a lower of the two holes through the back plate is spaced from the base plates toward the top edge of the back plate by a distance at least seven times the diameter of the first attachment means.

8. A holddown according to claim 1 wherein the exterior edge of each branch of the blank comprises an upper reach sloping downwardly and outwardly from the stem at a first relatively smaller angle, and a lower reach sloping downwardly and outwardly from the stem at a second relatively larger angle, so that the branches form side plates having an upper portion with a front edge sloping forwardly at a first relatively smaller angle and a lower portion with a front edge sloping forwardly at a second relatively larger angle.

9. The holddown according to claim 8 wherein the upper portion of each side plate slopes forwardly at an angle of about 10° with respect to the back plate.

10. The holddown according to claim 9 wherein the lower portion of each side plate slopes forwardly at an angle of about 35° with respect to the back plate.

11. A holddown formed from a single generally inverted Y-shaped blank of sheet metal stock having a stem and two diverging branches, the exterior edge of each of the branches of the blank comprising an upper reach sloping downwardly and outwardly from the stem at a first relatively smaller angle, and a lower reach sloping downwardly and outwardly from the stem at a second relatively larger angle, the profile of the stem being the same as the space between the branches so that the stems and branches of successive blanks can interfit in an end of end relationship, the holddown being adapted for connecting first and second generally perpendicular structural elements using first and second attachment means, each branch of the blank being folded along a line generally parallel with the axis of the stem so that the stem forms a back plate having at least one opening for receiving the first attachment means for attaching the back plate to the first structural element, and so that the branches form generally parallel first and second side plates extending in one direction, constituting the forward direction, from the back plate at opposite sides thereof, the side plates each having an upper portion with a front edge sloping downwardly and forwardly at a first relatively smaller angle and a lower portion with a front edge sloping downwardly and forwardly at a second relatively larger angle, said side plates being integrally connected to the back plate along respective side edges of the back plate;

each branch of the blank also being folded toward the other along a generally transverse fold line to form generally parallel overlapping first and second base plates disposed forward of the plane of the back plate and extending inwardly from said first and second side plates generally at right angles to the side plates, said first and second base plates being integrally connected to the first and second side plates, respectively, along the base edges of the side plates, the base plates having aligned openings for receiving the second attachment means for attaching the base plates to the second structural element.

12. The holddown according to claim 11 wherein the end of the stem of the blank that forms the top of the back plate and the end of the stem between the branches that forms the bottom of the back plate have mating semi-circular shapes.

13. The holddown according to claim 11 wherein the upper portion of each side plate slopes forwardly at an angle of about 10° with respect to the back plate.

14. The holddown according to claim 13 wherein the lower portion of each side plate slopes forwardly at an angle of about 35° with respect to the back plate.

* * * * *